United States Patent
Kessling et al.

(10) Patent No.: US 10,717,238 B2
(45) Date of Patent: Jul. 21, 2020

(54) METHOD FOR THE FURTHER PROCESSING OF A PREFABRICATED PRODUCT, AND ASSOCIATED PREFABRICATED PRODUCT

(71) Applicant: ARBURG GMBH + CO KG, Loßburg (DE)

(72) Inventors: Oliver Kessling, Loßburg-Lembach (DE); Eberhard Duffner, Starzach (DE)

(73) Assignee: ARBURG GMBH + CO KG, Lossburg (DK)

(*) Notice: Subject to any disclaimer, the term of this patent is extended or adjusted under 35 U.S.C. 154(b) by 53 days.

(21) Appl. No.: 15/517,993

(22) PCT Filed: Oct. 8, 2015

(86) PCT No.: PCT/EP2015/073224
§ 371 (c)(1),
(2) Date: Apr. 10, 2017

(87) PCT Pub. No.: WO2016/055555
PCT Pub. Date: Apr. 14, 2016

(65) Prior Publication Data
US 2017/0297273 A1    Oct. 19, 2017

(30) Foreign Application Priority Data
Oct. 10, 2014    (DE) ................. 10 2014 220 617

(51) Int. Cl.
*B29C 41/20*    (2006.01)
*B29C 41/22*    (2006.01)
(Continued)

(52) U.S. Cl.
CPC .......... *B29C 67/02* (2013.01); *B29C 33/3842* (2013.01); *B29C 37/0025* (2013.01);
(Continued)

(58) Field of Classification Search
CPC . B29C 33/3842; B29C 37/0025; B29C 41/20; B29C 41/22; B29C 45/14;
(Continued)

(56) References Cited

U.S. PATENT DOCUMENTS 9,440,397 B1* 9/2016 Fly .................... B29C 70/682
2001/0035597 A1 11/2001 Grigg
(Continued)

FOREIGN PATENT DOCUMENTS

DE   102013003167 A1   8/2014
EP   1886793 A1   2/2008
(Continued)

OTHER PUBLICATIONS

International Search Report for corresponding application PCT/EP 2015/0073224 filed on Oct. 8, 2015; dated Jan. 5, 2016.
(Continued)

*Primary Examiner* — Leo B Tentoni
(74) *Attorney, Agent, or Firm* — Cantor Colburn LLP

(57) ABSTRACT

In a method for the further processing of a product (30) that is preferably prefabricated in large numbers, the product has a surface (31) for an additive multi-dimensional application of material. Information for the additive multi-dimensional application of material is input into a device in which the multi-dimensional application of material is digitised from this information and is deconstructed into elements that are suitable for the additive application of the application of material to the surface (31). The prefabricated product (30) is introduced into a device (I) for additive application of the material application such that the elements for the additive multi-dimensional application of material on the surface (31) are assembled in accordance with the information using an additive manufacturing method. Because the surface is an individualising surface (31) of the prefabricated product,
(Continued)

and because the additive application of material is a multi-dimensional individualisation that is intended and suitable for individualising the product, and because at least one of the prefabricated products is identified by the information and is provided individually with the multi-dimensional individualisation (32), a method is provided by which products that are prefabricated in relatively large numbers can be further processed, individualised or personalised to meet individual demands. The prefabricated product (30) is equipped with an associated information carrier for receiving the information for individualisation that supports the method sequence.

20 Claims, 5 Drawing Sheets

(51) Int. Cl.

| | | |
|---|---|---|
| B29C 67/02 | (2017.01) | |
| B33Y 80/00 | (2015.01) | |
| B29C 64/112 | (2017.01) | |
| B29C 70/74 | (2006.01) | |
| B29C 37/00 | (2006.01) | |
| B29C 45/14 | (2006.01) | |
| B29C 33/38 | (2006.01) | |
| B29C 45/16 | (2006.01) | |
| G06K 19/07 | (2006.01) | |
| B41J 3/407 | (2006.01) | |
| B29C 70/68 | (2006.01) | |

(52) U.S. Cl.
CPC .. *B29C 45/14311* (2013.01); *B29C 45/14688* (2013.01); *B29C 45/1679* (2013.01); *B29C 64/112* (2017.08); *B29C 70/68* (2013.01); *B29C 70/747* (2013.01); *B33Y 80/00* (2014.12); *B41J 3/4073* (2013.01); *G06K 19/0723* (2013.01); *B29C 45/14336* (2013.01); *B29C 45/1671* (2013.01); *B29C 2045/14868* (2013.01); *B29C 2045/166* (2013.01); *B29C 2791/001* (2013.01); *B29C 2795/007* (2013.01)

(58) Field of Classification Search
CPC ......... B29C 45/14311; B29C 45/14688; B29C 2045/14868; B29C 2045/1657; B29C 2045/166; B29C 45/1671; B29C 45/1679; B29C 64/112; B29C 64/118; B29C 70/68; B29C 70/682; B29C 70/683; B41J 3/4073; B41M 5/0047; B41M 5/0064; B41M 5/0088; G06K 2017/0045; G06K 2017/0087; G06K 19/0723
USPC .... 264/129, 219, 250, 259, 279, 279.1, 308; 340/572.1; 428/542.8
See application file for complete search history.

(56) References Cited

U.S. PATENT DOCUMENTS

| | | | |
|---|---|---|---|
| 2006/0268044 A1* | 11/2006 | Silverbrook | B29C 70/68 347/19 |
| 2009/0177309 A1 | 7/2009 | Kozlak | |
| 2012/0203365 A1 | 8/2012 | Hummeler | |
| 2014/0020192 A1 | 1/2014 | Jones | |
| 2014/0202999 A1* | 7/2014 | Wescott | B23K 26/352 219/121.85 |
| 2015/0294033 A1* | 10/2015 | Cudak | G06F 17/50 700/98 |

FOREIGN PATENT DOCUMENTS

| | | | | |
|---|---|---|---|---|
| EP | 2620289 | A2 | 7/2010 | |
| JP | 10258596 | A | 9/1998 | |
| JP | 2011084054 | A | 4/2011 | |
| WO | 2010071445 | A1 | 6/2010 | |
| WO | WO-2010071445 | A1 * | 6/2010 | ............. B29C 45/14 |
| WO | 2013154723 | A1 | 10/2013 | |
| WO | 2014005591 | A1 | 1/2014 | |
| WO | 2014070007 | A1 | 5/2014 | |

OTHER PUBLICATIONS

Japanese Office Action for JP Patent Application No. 2017-519272; dated Oct. 15, 2019.

* cited by examiner

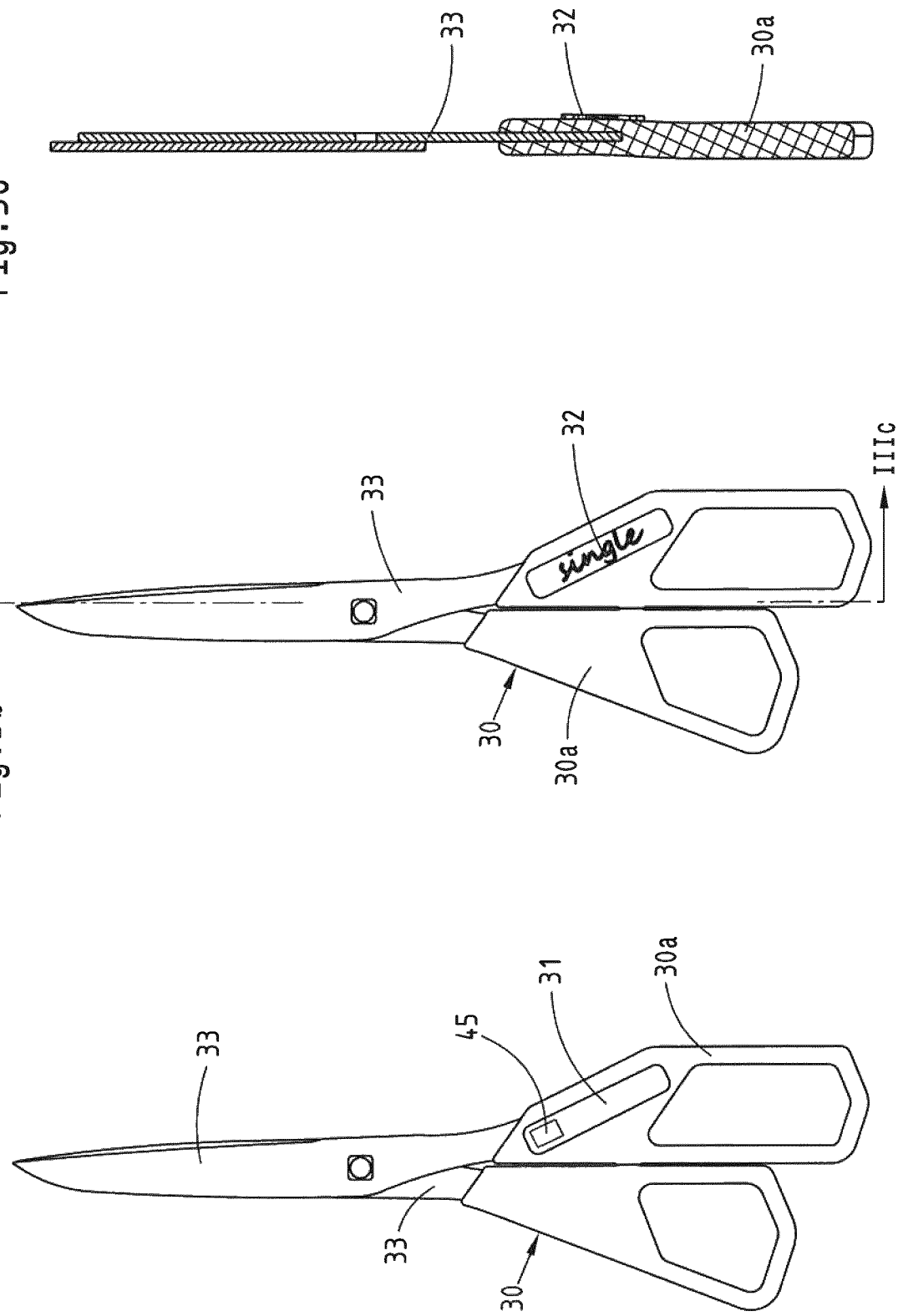

METHOD FOR THE FURTHER PROCESSING OF A PREFABRICATED PRODUCT, AND ASSOCIATED PREFABRICATED PRODUCT

CROSS REFERENCE TO RELATED APPLICATIONS

The present invention claims the priority of German patent application 10 2014 220 617.0, filed on 10 Oct. 2015, the disclosure content of which is herein incorporated by reference in its entirety.

TECHNICAL FIELD

The invention relates to a method for the further processing of an at least partly prefabricated product having an individualizing surface and a prefabricated product.

Within the context of this application, the term "individualizing surface" should be understood as including any desired surfaces that are also curved or shaped in three dimensions and are intended and suitable for the application of a multi-dimensional individualization.

The term "individualization", within the context of this application, should be understood to mean that a prefabricated product, such as an injection molded part as a consumer product, is singly further processed, identified and individualized to result in any prefabricated product. An individualization is applied such that an individual product is produced from a product that is prefabricated in relatively large numbers and in anonymous manner.

BACKGROUND

As a starting point, the task repeatedly arises of individualizing, in the most diverse ways, products that have already been prefabricated in relatively large numbers, be it a semi-finished product or an article that is manufactured in any desired manner. The individualization may be a serial number, a signature or another item of personal information, but it is equally conceivable for the individualization to serve to provide the product with a protection against copying.

WO 2013/154723 A1, discloses a method and a product in which insert parts are encapsulated by additive manufacturing. First, and preferably likewise additively, a base is manufactured onto or into which the subsequently embedded insert part is introduced. The method is intended for the simultaneous processing of 10 to 40 parts, wherein a UV-curing material is ejected in layers and applied in order to embed the insert part. There is no provision for individualization to result in the respective single product from a plurality of identical prefabricated products.

WO 2014/005591 A1 discloses providing, on a product that is manufactured by the injection molding of plastics, a mounting surface on which a further part, subsequently detachable from this product again, is applied by additive manufacture such that individually shaped components are produced. The objective is a high degree of freedom in shaping, while at the same time producing a reliable connection between the components of the starting product and the further component that is manufactured on the mounting surface.

WO 2010/071445 A1 discloses manufacturing complex parts using 3D techniques and then injection molding around them. To put it another way, a 3D printed product is taken as the basis and a surface is then applied thereto by injection molding it on as appropriate. The objective is to obtain a surface as in the case of an end product that is manufactured by injection molding, but without individualization.

US 2001/0035597 A1 discloses the application of marks, including those in three dimensions, to semiconductor products by stereolithography, in order in this way to determine the position and orientation of the semiconductors during the processing procedure.

An additive manufacturing method for the application of drops that are joined together is known in particular from EP 1 886 793 A1. There, a plasticizing unit that is known in the injection molding technique and which prepares, mixes and homogenizes the material is coupled to a pressurizable material reservoir. In order to produce an article on an object carrier, this material is discharged in the form of drops, via a discharge opening. Because of the adhesive forces of the material and the required small drop size, in the range of 0.01 to 0.05 mm$^3$, in this case a pressure at a level of more than 10 to 100 MPa is required with high melting points. However, the plasticizing unit has the advantage that conventional injection molding materials can be used, since as a result of the preparation raw materials of this kind, which are usually free-flowing, can be put in a liquid aggregate condition. Moreover, the temperature of the material and that of the applied drops can be influenced such that an optimum connection is made between the drop and the substrate.

BRIEF SUMMARY

Taking this prior art as a starting point, the disclosure provides a method as a result of which products that are prefabricated in relatively large numbers can be further processed, individualized or personalized to meet individual demands. Further, a prefabricated product that makes this method possible is to be provided.

According to the method, the starting point is a prefabricated product that has an individualizing surface as the surface for an additive multi-dimensional application of material. Information for the additive multi-dimensional application of material is provided for the three-dimensional individualization of the product, with the result that this three-dimensional individualization can be prepared such that additive application on the individualizing surface is possible. The prefabricated product is then placed into a corresponding device for additive application of the individualization, and the multi-dimensional individualization, which has been digitally deconstructed into the various elements, such as layers, is assembled again on the individualizing surface such that the prefabricated product is individualized appropriately after this further processing procedure. This can be performed singly for each product, depending on the machine cycle. It is thus possible for a prefabricated product such as an injection molded part as a consumer product to be individually further processed, identified and individualized from a plurality of similar products.

For example, a customer may specify that the prefabricated product is individualized for example with the customer's logo, signature or an image that the customer writes, copies or deposits in another suitable manner in a field in an order. This order is read in and a product that is prefabricated in relatively large numbers, for example by injection molding, is provided that has the appropriate individualizing surface. This product is then provided with the multi-dimensional individualization in a device for additive manufacturing, that is to say the individualization is applied such that an individual product is created from a product that is prefabricated in relatively large numbers and in anonymous manner.

Preferably, the additive application is performed by discharging drops that are joined together. Where necessary, the prefabricated product may also itself be manufactured by an additive manufacturing method, but it may equally be a product that is manufactured for example by an injection molding procedure in which insert parts are inserted at the same time. Likewise, a holder that is used in the device for additive manufacture to hold the prefabricated product there may also itself be manufactured by this device, that is to say the information that makes it possible to manufacture a product is likewise used to create the holder. Preferably, the product itself may include this information in the form of order and processing data, for example in that there is a QR code on the prefabricated product or indeed on the individualizing surface, or an RFID component accompanies the product during the further processing procedure.

For further processing of this kind for the purpose of individualization, the product is equipped with an information carrier, or an information carrier accompanies it in a holding element or region that is separable from the product. Using the information on the information carrier, the individualization is then carried out in the form of mutually connected drops.

Where necessary, material in which the multi-dimensional individualization is embedded, or indeed which covers it, may be applied to the prefabricated product in further method steps. Moreover, further materials may be applied by suitable method steps such as, once again, additive manufacture, and these further individualize the prefabricated product by creating for example a particular feel that is adapted to the user.

Further advantages are apparent from the sub claims and the description given below of preferred exemplary embodiments.

BRIEF DESCRIPTION OF THE FIGURES

The invention is explained in more detail below with reference to exemplary embodiments that are illustrated in the Figures, wherein:

FIG. 3a shows a view of a prefabricated product with an individualizing surface, FIG. 3b shows a view of the product according to FIG. 3a with a multi-dimensional individualization applied thereto, FIG. 3c shows a section along line IIIc-IIIc in FIG. 3b, FIG. 4b shows a section along line IVb-IVb in FIG. 4a, and FIGS. 5a, 5b show a prefabricated product with a covered individualization, in plan view and in section along line Vb-Vb in FIG. 5a.

DETAILED DESCRIPTION

The invention is now explained in more detail by way of example, with reference to the attached drawings. However, the exemplary embodiments are only examples, which are not intended to restrict the inventive concept to a particular arrangement. Before the invention is described in detail it should be pointed out that it is not restricted to the respective constituent parts of the device and the respective method steps, since these constituent parts and method may vary. The terms used here are merely intended to describe particular embodiments and are not used restrictively. Moreover, where the singular or the indefinite article is used in the description or the claims, this also refers to the plural of these elements unless the overall context unambiguously indicates otherwise.

Figure 1:
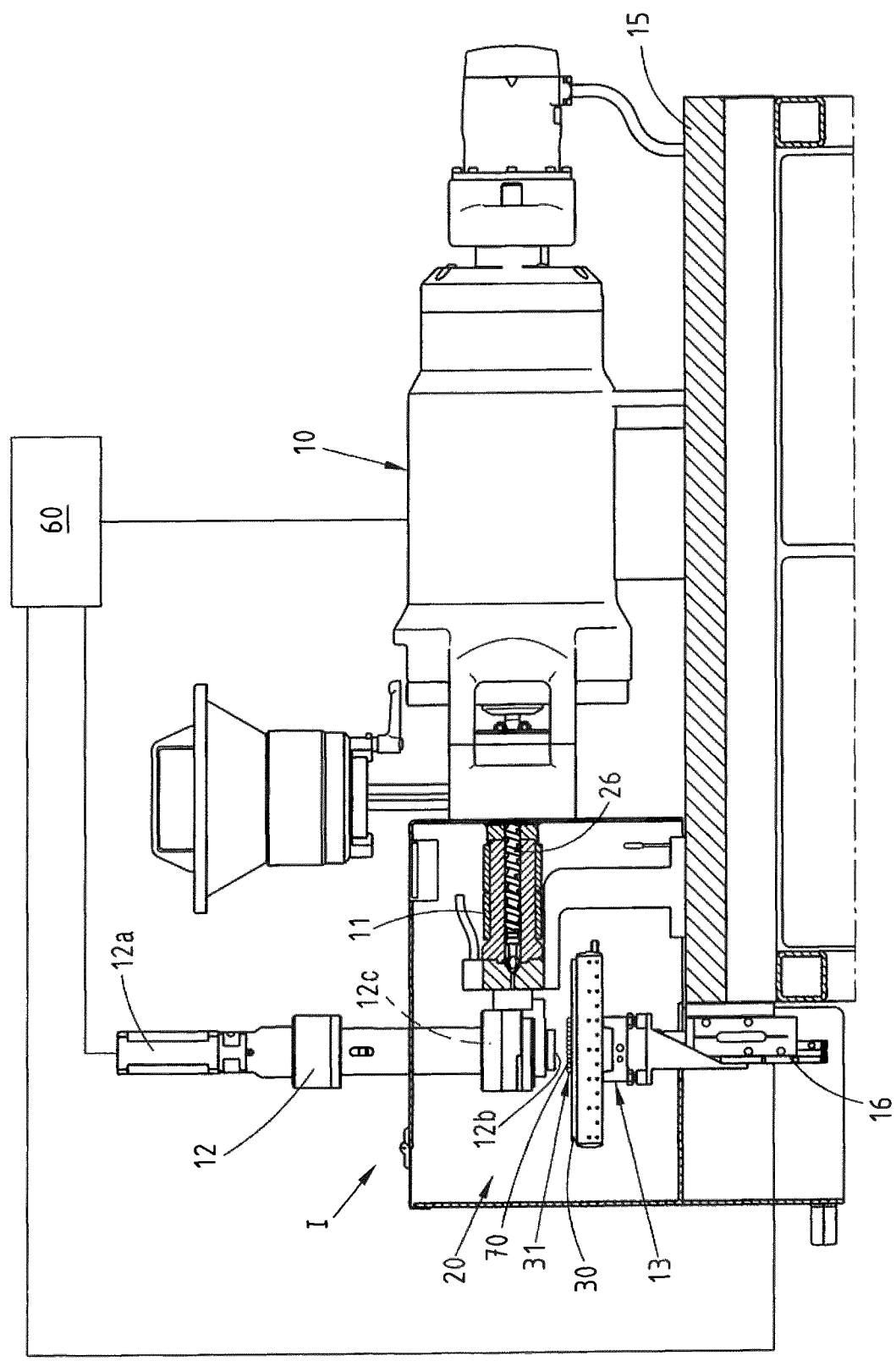
FIG. 1 shows a view, partly in section, of a device for additive manufacturing.

Before discussing the method sequence for further processing of prefabricated products 30 according to FIGS. 2 to 5b, the structure and mode of operation of a device I for manufacturing a three-dimensional article by additive manufacturing from at least one solidifiable material is first explained with reference to FIG. 1. The material 34 which is used in the exemplary embodiment for producing an additive multi-dimensional material application as a multi-dimensional individualization 32 is plasticized or liquefied for processing by means of a plasticizing unit. Here, a plasticizing unit that is known per se in the technique of injection molding is used, and this prepares, mixes and homogenizes the material. At the same time, the plasticizing unit generates a high pressure that is required for discharge, preferably in the form of drops, in a range of more than 10 to 100 MPa. Using the plasticizing unit that is illustrated in FIG. 1 by the pressure-generating unit 10 and the preparation unit 11, materials and additives that are conventional in the injection molding technique may be used, which are usually in a free-flowing starting condition and are transformed in the liquid aggregate condition by the plasticizing unit. This material preferably cures after discharge from a discharge unit 12 and hence forms the article to be manufactured, i.e. the multi-dimensional individualization 32. In principle, curing using further agents is not required. In particular, a layer need not cure before the next layer can be applied. As a result, the materials can also be manufactured "wet on wet" with overlapping layers, that is to say drops 70 of the preceding layer may but need not yet be plasticized or undergo heat treatment such that a better connection between the layers is produced than if a layer is already fully cured before drops 70 of the next layer are applied thereto.

Preferably, for this purpose drops 70 are discharged from a pressurized material reservoir 12c, by way of the outlet opening 12b and in the direction of the object carrier 13 and the prefabricated product 30 there, inside a structural space 20. As a result of the sequential discharge of drops 70 or indeed strands or threads, the multi-dimensional individualization 32 is thus produced in the structural space 20, layer by layer, on the object carrier 13 that is movable in relation to the outlet opening 12b by a drive unit 16. The material reservoir 12b is filled by the conveying means 26 and pressurized. The entire device is located on a machine bed 15. It is controlled by way of a control device 60, which, on the basis of predetermined or input information, controls the drive part 12a of the discharge unit 12, the drive unit 16 for the object carrier 13, and the pressure-generating unit 10.

Since the type of material and processing thereof are crucial to the result of the method, that is to say to the quality of the article manufactured, it is discussed in detail. The solidifiable material is a plasticized material such as silicone, or a plasticizable material such as thermoplastics or indeed materials in powder form. The material may also be a material that is reversibly meltable under heat and hence recyclable. Thus, possible materials are also conventional materials that are used in the injection molding of plastics, that is to say that there is no need to resort to expensive specialist materials. Standard materials of this kind that are known from the injection molding technique are inexpensive and at the same time available throughout the world. However, these materials are highly viscous, unlike other materials used in normal thermal printing or inkjet methods. The dynamic viscosity number of the solidifiable material is between 100 and 10 000 Pa·s, with the result that corresponding pressures of more than 10 to 100 MPa are required, in particular for obtaining small drop volumes.

In practice, however, it has been found that it is precisely this procedure and the pressure that contribute to giving good results during manufacture. The material is prepared, mixed and homogenized and is discharged, preferably in drops, directly out of the material reservoir, which is at the said pressure. These discharged drops at the same time create the final geometry, that is to say they cure without further agents or cooling. As a result of pressure, processing such as that in injection molding, and discharge in drops, the drops are joined together or melted into one another, which results in an extremely firm connection between the materials.

Figure 2:
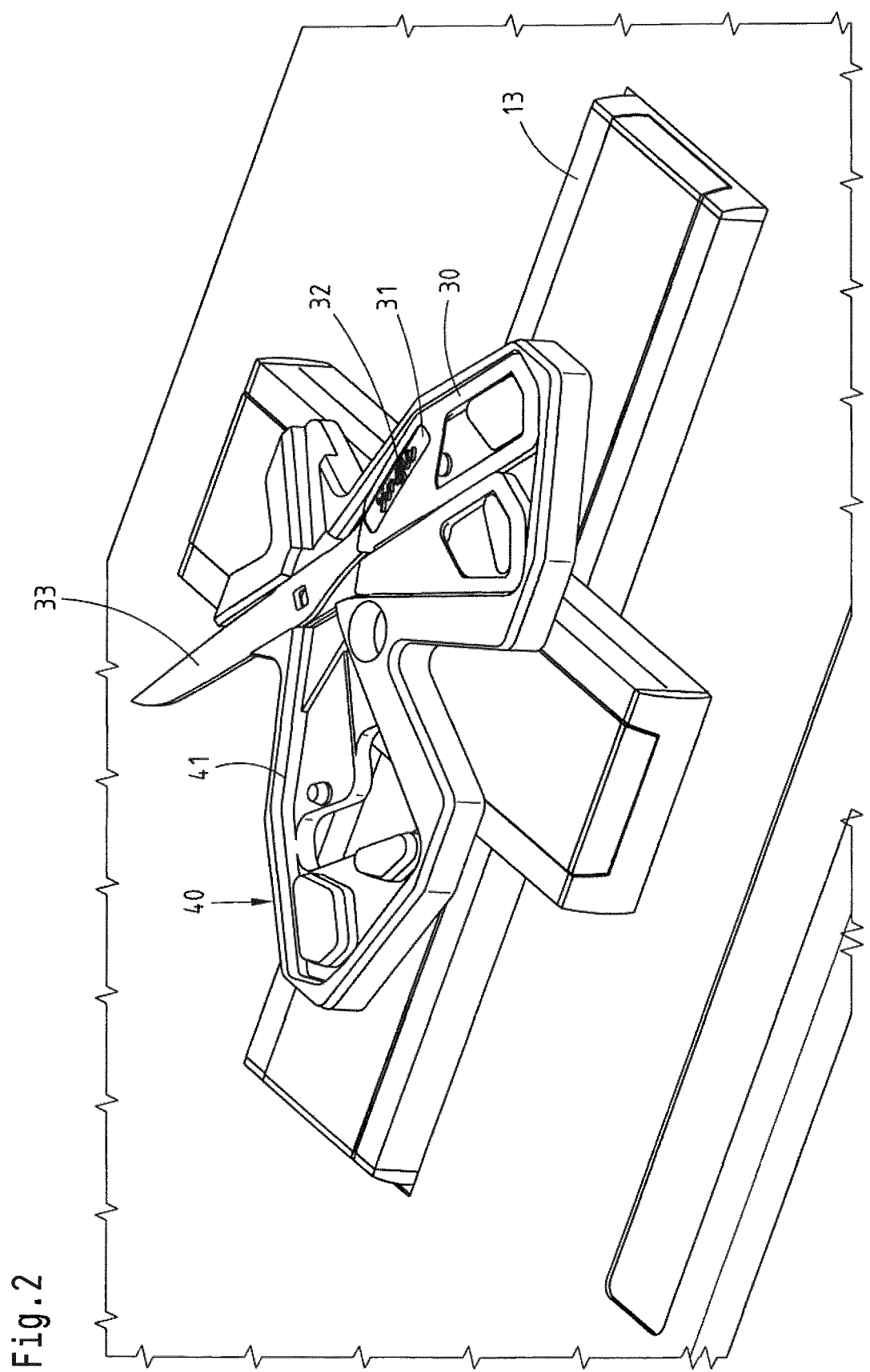
FIG. 2 shows a three-dimensional illustration of an object carrier having mounted thereon a holder, in which the prefabricated product is inserted.
Figure 4B:
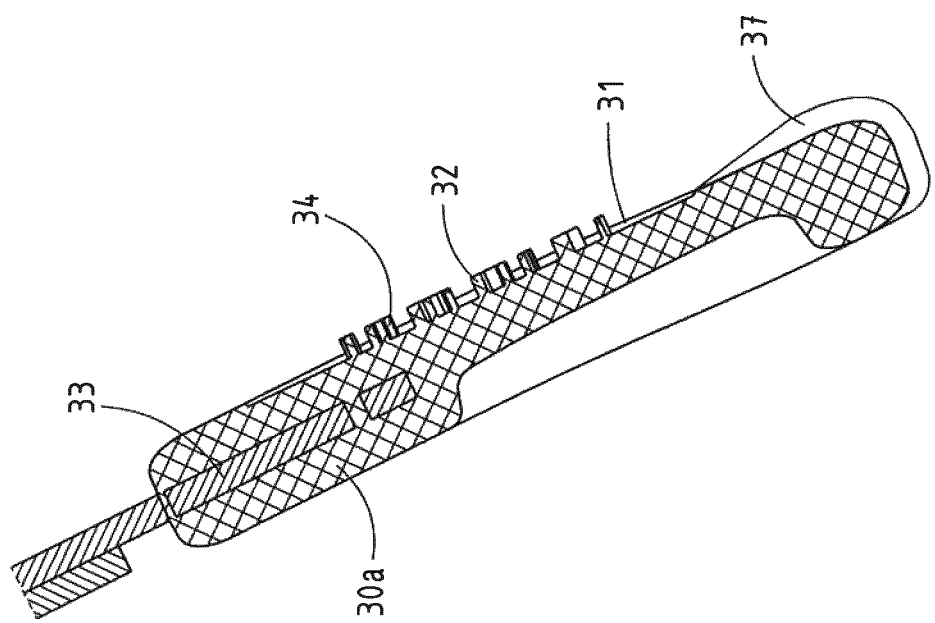
Figure 4A:
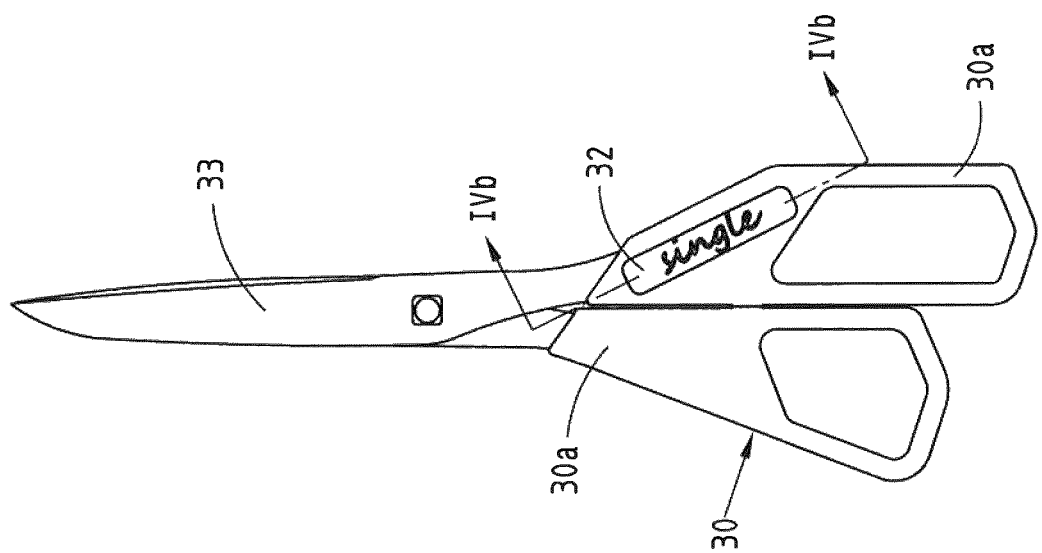
FIG. 4a shows an illustration according to FIG. 3b.
Figure 5A:
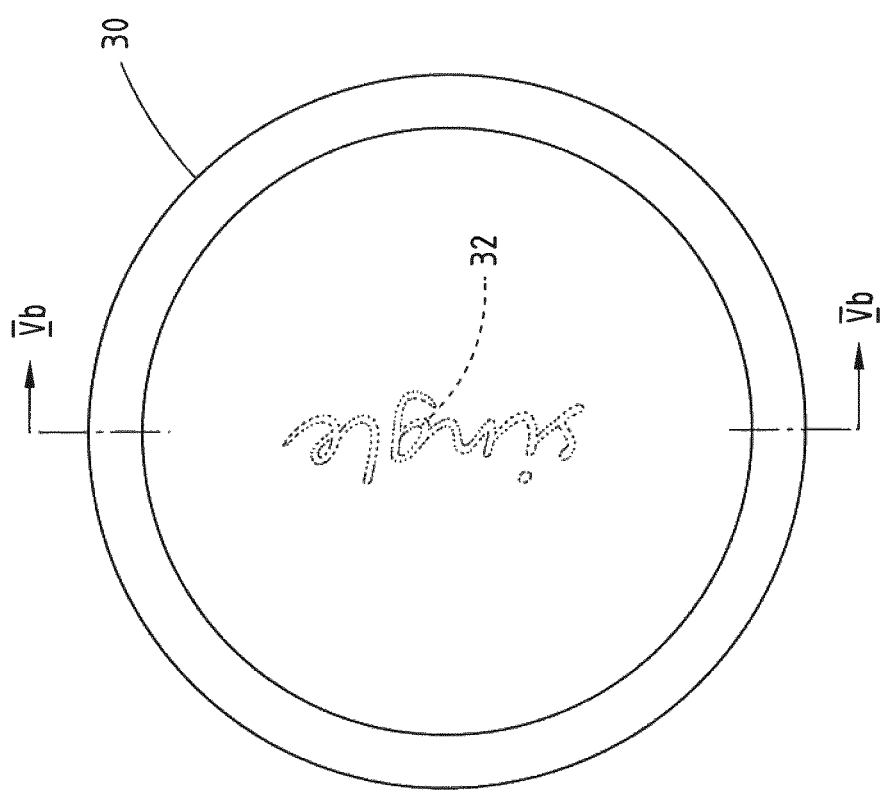
Figure 5B:
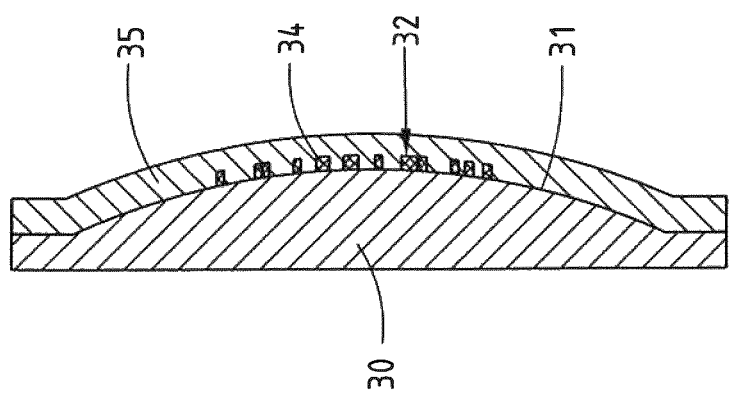

FIGS. 2 to 5b show the procedure with a method for further processing of an at least partly prefabricated product 30, which in FIGS. 2 to 4b is a pair of scissors and in FIGS. 5a, 5b a lens. Products of this kind may be mass-produced parts which are created for example by an injection molding procedure or another manufacturing procedure. FIG. 2 shows a holder 40 that is arranged on an object carrier 13 formed by an X/Y carriage. Visible in the Figure is a receiving region 41 in the holder 40, wherein the left-hand region, which is not provided with a prefabricated product 30, is a mirror image of the right-hand region in which a pair of scissors is inserted. The background to this procedure is that a prefabricated product such as an injection molded part as a consumer product is to be singly further processed, identified and individualized. Continuing with the example of the pair of scissors, the procedure is as follows:

A customer or end user specifies in an order whether a left-handed or right-handed pair of scissors is desired. Depending on this choice, the prefabricated product must in fact later be placed with the handles 30a in the left-hand or right-hand region of the holder 40 in FIG. 2. Further, the customer gives permission for the scissors to be individualized, for example with the customer's logo, signature or an image, wherein the customer writes or copies this information on three-dimensional individualization in an order or deposits it in a file or similar. This order is input, that is to say copied and digitized, such that in a preceding manufacturing procedure such as an injection molding procedure, with the metal blade parts automatically inserted individually as the insert parts 33, a pair of scissors for left-handed or right-handed users is produced in an injection mold with appropriate shaping of the handles 30a. As a result of this step, the handles 30a are connected to the insert parts. The connection of the handle 30a and the insert part 33 may be performed in a separate manufacturing step or indeed in the same manufacturing step as that in which the multi-dimensional individualization 32 is also produced. In this case, the handles 30a would be shaped by additive manufacture.

After the injection molding procedure, a QR code corresponding to the order data and the actual injection molding data that have been used for the part during the automated injection molding is printed directly onto the activatable plastics material on the part, for example by means of a laser. The pair of scissors that is produced in this way may be introduced, as a prefabricated product 30, into a device I for additive manufacturing of the multi-dimensional individualization, wherein the term "multi-dimensional manufacture" should be understood to mean three-dimensional manufacture or manufacture in which a flat element is made three-dimensional. Preferably, the customer order is retrieved there from a QR code and the associated desired individual logo is deconstructed from the order into elements by means of an algorithm, that is to say is deconstructed into layers. The pair of scissors is then laid in the holder 40 in a manner dependent on whether it has been constructed as a right-handed or left-handed pair of scissors, and in the device I is provided with the multi-dimensional individualization 32. This multi-dimensional individualization 32, which has previously been digitized and deconstructed into elements that are suitable for additive application of the individualization on a surface 31 as a multi-dimensional application of material, is re-constructed according to the information provided to give the multi-dimensional individualization again, that is to say the individualization 32 is created. The surface 31 is thus an individualizing surface and is designated an individualizing surface 31 below. Where necessary, the individualization produced in this way may additionally be coated in a further material 35 which is for example transparent, in that material is injected around the product for example in a further injection molding procedure. Likewise, it is possible to apply further material 37 in order to improve the pair of scissors with a transparent soft component for enhancing the ergonomics and feel. As a result of the information, at least one of the prefabricated products 30 is identified and individually provided with the multi-dimensional individualization 32.

According to FIG. 1, the additive application of the individualization may be performed by drops 70 that are joined to one another. The prefabricated product 30 itself may also be manufactured by an additive manufacturing method or another method such as injection molding. FIGS. 3a to 3c make it clear that in the exemplary embodiment the pair of scissors, as the prefabricated product 30, has the individualizing surface 31, in which an information carrier 45 may also be arranged. The information carrier 45 may also be arranged at another location on the product, or, in a manner which is not illustrated, may also accompany the product during the manufacturing procedure, that is to say be provided separately from the product and/or be separable from the product.

FIGS. 3a and 3b differ in that the multi-dimensional individualization 32 has already been applied in FIG. 3b. It can be seen from FIG. 3c, the sectional illustration of 3b along the line IIIc-IIIc, that the multi-dimensional individualization 32 is in fact applied on top. The handles 30a are connected to the insert parts of the scissor blades and are molded onto the latter.

The multi-dimensional individualization 32 may for example be a preferably one-off pattern desired by the user and the client. This pattern may also be a three-dimensional object. In both cases, the individualization 32 is digitized and deconstructed into elements for additive manufacturing, that is to say is deconstructed into layers which are then constructed drop by drop or strand by strand by the device I for additive manufacturing of the individualization.

Possible multi-dimensional individualizations 32 are in particular elements that have a predetermined geometry, and may be a serial number or a signature or an image. The multi-dimensional individualization 32 may also be a protection against copying, however, which is no longer visible on the finished product but makes it possible for the manufacturer to identify it again. For this, but not only for this purpose, the material 34 that is used for the additive application may be coded and/or electrically detectable. If a protection against copying of this kind is included in tamper-proof manner in the finished product, the result is a reliable protection against counterfeiting.

According to FIG. 5b, a further application of material 35 may be performed on a prefabricated product 30 such as the lens illustrated in FIG. 5a such that the individualization 32 is covered by the application of material 35 in a further manufacturing step. The material applied in FIG. 5a is opaque, but it may equally be transparent or semi-transparent. The further application of material 35 may be performed by injecting material around the prefabricated product 30 which is provided with the multi-dimensional individualization 32, for example in the mold cavity of an injection mold on an injection molding machine.

In order to improve the adhesive properties of the individualizing surface 31, before the additive application of the individualization the individualizing surface may be pre-treated. This may be done by means of a laser, but a laser may also be used for annotation, in that for example a QR code that contains further information for the processing is applied. This annotation may be covered by the later multi-dimensional individualization 32. A plasma pre-treatment of the individualizing surface is likewise possible for the purpose of improving the adhesive properties.

It is also possible, for application of the multi-dimensional individualization 32, for the holder 40 for the prefabricated product 30 to be manufactured on the device I for additive application in a step before the individualization, wherein the holder 40 is then adapted to the prevailing kinematics of the device I.

Preferably, the prefabricated product 30 itself includes the information for individualization in the form of order and processing data, in that either a corresponding QR code is mounted thereon or an RFID component is provided on the product or accompanies the product. The device I for additive application of the multi-dimensional individualization 32 identifies the prefabricated product 30 on the basis of this included information and processes it further accordingly.

According to FIG. 2a, the prefabricated product 30 has the individualizing surface 31 and, in the exemplary embodiment, is provided with an information carrier 45 that is associated with the prefabricated product 30, for receiving information for individualization of the prefabricated product. The information carrier 45 and the prefabricated product are conveyable together, at least during the manufacturing procedure. In FIG. 2a, this information carrier 45 is located on the individualizing surface 31 and is later covered by the multi-dimensional individualization 32. However, it may also be at any other location on or in the vicinity of the prefabricated product 30 and pass through the manufacturing sequence together with the prefabricated product. Based on the included information, the multi-dimensional individualization 32 is produced on the individualizing surface 31 in the form of mutually connected drops 70, as is also visible from the finished product.

The prefabricated product is preferably an injection molded part, in particular having insert parts 33 as visible in FIGS. 2a to 4b. The multi-dimensional individualization is a for example one-off pattern or a three-dimensional object and includes at least one of the elements in the group comprising a predetermined geometry, a serial number, a signature, an image or a protection against copying. Preferably, the material 34 used for the multi-dimensional individualization 32 is coded and/or electrically detectable. The multi-dimensional individualization 32 may be coated with a further application of material 35 which is preferably transparent, semi-transparent or opaque. The prefabricated product may have further materials 37 for individual adaptation to the user. This material 37 is suitable for producing for example elastic surfaces or surfaces with a pleasant surface feel.

In principle, it is also possible to apply different materials, in order for example to produce prints of different colors or different degrees of hardness in a multi-dimensional individualization 32 using two components or a plurality of components. Individualization may be performed on a labelling field that has already been annotated by the laser.

It goes without saying that this description may be subject to the broadest possible variety of modifications, changes and adjustments which are within the range of equivalents to the attached claims.

The invention claimed is:

1. A method for the further processing of an at least partly prefabricated product that has a surface for an additive multi-dimensional application of material, the method comprising:
    inputting information for the additive multi-dimensional application of the material into a device for additive application in which the multi-dimensional application of the material is digitized from the information and is deconstructed into elements that are suitable for the additive multidimensional application of the material to the surface,
    introducing the prefabricated product into the device for additive application of the multi-dimensional material application such that the elements for the multi-dimensional application of the material on the surface are assembled in accordance with the information using an additive manufacturing method,
    wherein the surface is an individualizing surface of the prefabricated product, and the multi-dimensional application of the material is a multi-dimensional individualization comprising the material, which individualization is an individually formed three dimensional object and is configured and adapted for depositing the individualization for individualizing the prefabricated product, such that an individual product is produced from the prefabricated product that is fabricated in relatively large numbers and in anonymous manner,
    wherein the at least one prefabricated product is identified by the information and is provided individually with the multi-dimensional individualization, and
    wherein the at least partly prefabricated product includes a further surface which is not subject to said multi-dimensional individualization.

2. A method according to claim 1, wherein the additive application is performed by drops that are preferably joined together in the still plastic condition.

3. A method according to claim 1, wherein the prefabricated product is itself manufactured by an additive manufacturing method.

4. A method according to claim 1, wherein the multi-dimensional individualization is a one-off pattern that is digitized and deconstructed into the elements for the additive application.

5. A method according to claim 1, wherein the multi-dimensional individualization includes at least one of elements including a predetermined geometry, a serial number, a signature or an image, or takes the form of and is used as a protection against copying.

6. A method according to claim 1, wherein the material that is used for the additive application of the multi-dimensional individualization is at least one of being coded or electrically detectable.

7. A method according to claim 1, wherein the individualizing surface that is provided with the multi-dimensional individualization is provided in a further manufacturing step with a further application of a further material which is transparent, semi-transparent or opaque.

8. A method according to claim 7, wherein the further application of the further material is performed by injecting the further material around the prefabricated product which is provided with the multi-dimensional individualization, in the mold cavity of an injection mold on an injection molding machine.

9. A method according to claim 1, wherein, in order to improve adhesive properties, before the additive application of the individualization the individualizing surface is pre-treated.

10. A method according to claim 1, wherein the individualizing surface is pre-treated or annotated by means of a laser.

11. A method according to claim 1, wherein, for application of the multi-dimensional individualization, a holder for the prefabricated product is also manufactured additively on the device for the additive application in a step before the individualization, wherein the holder is adapted to the prevailing kinematics of the device for the additive application.

12. A method according to claim 1, wherein at least one further material for at least one of an individual adaptation to the user or a multi-dimensional further individualization of the product is additively applied to the prefabricated product.

13. A method according to claim 12, wherein elastic surfaces, being at least one of elastic or having a particular feel, are formed from the further material.

14. A method according to claim 1, wherein the prefabricated product itself carries the information for the individualization in form of order and processing data, and wherein the device for the additive application of the multi-dimensional individualization identifies the prefabricated product on the basis of the included information and processes it further.

15. A prefabricated product comprising a surface for an additive multi-dimensional application of material, and having an information carrier that is associated with the prefabricated product, for receiving information for the additive multi-dimensional application of the material,
wherein the information carrier and the prefabricated product are conveyable together,
wherein the surface is an individualizing surface of the prefabricated product that is intended and suitable for individualizing the prefabricated product, such that an individual product is produced from the prefabricated product that is fabricated in relatively large numbers and in anonymous manner,
wherein, based on the information, the additive material application is a multi-dimensional individualization that, for the formation of an individually formed three dimensional object, is formed by drops, which are molten to one another and thus are mutually firmly connected,
wherein the individualization is configured and adapted for depositing the individualization for individualizing the prefabricated product;
wherein the prefabricated product includes said individualizing surface and another surface which is not subject to said multi-dimensional individualization.

16. A prefabricated product according to claim 15, wherein the multi-dimensional individualization is a one-off pattern.

17. A prefabricated product according to claim 15, wherein the multi-dimensional individualization includes at least one of elements including a predetermined geometry, a serial number, a signature, an image or a protection against copying.

18. A prefabricated product according to claim 15, wherein the material that is used for the multi-dimensional individualization (32) is at least one of being coded or electrically detectable.

19. A prefabricated product according to claim 15, wherein the multi-dimensional individualization is coated with a further application of a further material which is transparent, semi-transparent or opaque.

20. A prefabricated product according to claim 15, wherein the prefabricated product has further materials for individual conformation to the user.

* * * * *